US005517869A

United States Patent [19]
Vories

[11] Patent Number: 5,517,869
[45] Date of Patent: May 21, 1996

[54] HYDROSTATIC ALTIMETER ERROR COMPENSATION

[75] Inventor: Dennis L. Vories, Valley Center, Calif.

[73] Assignee: The Stanley Works, New Britain, Conn.

[21] Appl. No.: 177,534

[22] Filed: Jan. 4, 1994

[51] Int. Cl.$^6$ ............................................. G01C 5/00
[52] U.S. Cl. ........................................................ 73/865.2
[58] Field of Search .................................. 73/385, 865.2, 73/384; 33/367, 366

[56]  References Cited

U.S. PATENT DOCUMENTS

| | | | |
|---|---|---|---|
| 3,815,423 | 6/1974 | Gearhart | 73/865.2 |
| 3,842,513 | 10/1974 | Clark | 33/367 |
| 4,003,263 | 1/1977 | O'Rourke | 73/865.2 |
| 4,026,156 | 5/1977 | Bowditch et al. | 73/865.2 |
| 4,087,920 | 5/1978 | Huggett et al. | 33/367 |
| 4,379,367 | 4/1983 | Legris | 73/865.2 |

*Primary Examiner*—Richard Chilcot
*Assistant Examiner*—Ronald L. Biegel
*Attorney, Agent, or Firm*—Thomas J. Tighe

[57] ABSTRACT

A device for providing one or more signals that are functions of a sensor module's altitude relative to a reference body of liquid. The sensor module has one or two hydrostatic pressure transducers, which transducers are linked to the bodies of liquid by respective liquid-filled elongated flexible conduits. The first two embodiments have only single transducers each connected by a single conduit to a single body of liquid. In each case, the body of liquid is under ambient atmospheric pressure plus added pressure to maintain a positive pressure with respect to ambient atmospheric pressure to prevent dissolved gases from coming out of solution and creating bubbles in the conduits. In a third embodiment, a differential transducer has one port linked to the body of liquid and a second port linked to a pressurized gas which also applies pressure to the body of liquid, again to maintain positive pressure within the operational limits of the device. In a fourth embodiment, a second body of liquid is contained within but not mixed with the first body of liquid which is also under atmospheric pressure and subjected to additional pressure. Each body of liquid is linked to a separate input port of the differential transducer. A fifth embodiment is similar in form to the fourth embodiment with the addition of a second pressure transducer linked to the first body of liquid only.

10 Claims, 2 Drawing Sheets

HYDROSTATIC ALTIMETER ERROR COMPENSATION

BACKGROUND OF THE INVENTION

This invention relates in general to hydrostatic altimeters, and in particular to those having an elongated, liquid filled, flexible tube linking a body of liquid at one end of the tube and a pressure sensor at the other end of the tube, the difference in hydrostatic pressure at the opposite ends being indicative of the altitude of the sensor end relative to the body of liquid.

Hydrostatic altimeters, such as disclosed in U.S. Pat. No. 4,878,297 by Vories, offer many advantages over conventional optical methods of elevation measurement and leveling. A hydrostatic altimeter works on the basis of pressure developed within a liquid filled tube ("link") due to the density or specific weight of the liquid ("link liquid") and the liquid elevation difference between the link's two ends. This principle of operation permits a single operator to use the hydrostatic altimeter around corners or among brush and trees where optical or laser levels will not function. For a hydrostatic altimeter to be a precision instrument under all environmental conditions, all environmental parameters which influence its accuracy must be corrected by appropriate compensation. Pressure transducer and processing electronics zero offset, span, non-linearity and drift of these and other parameters can be readily compensated for within the device, but density changes in the link liquid caused by changes in temperature must also be compensated for since these changes effect the pressure measured by the transducer at the ends. A ratio of unit changes in the density of a liquid per unit changes in temperature is commonly known as the temperature coefficient of density (TCD) of the liquid. To date, patents and published literature offer no means for adequately compensating for the TCD of a link liquid.

One U.S. patent addresses the TCD of a link liquid. Gaucher et al. in U.S. Pat. No. 4,397,099 describes a two transducer hydrostatic altimeter (two absolute pressure transducers are used to measure pressure at both extreme ends of the tube) having a resistance wire temperature sensor that runs within the entire length of the link tube in order to measure the average temperature of the liquid link. This measurement is used to compensate for temperature effects on the link liquid. However this scheme does not take into account the role of each segment of the link in the overall vertical liquid column, i.e. the role of each segment in developing the hydrostatic pressure. This scheme only works properly if the entire length of the link is used and is uniformly sloped - a condition that seldom exists in reality. A scheme such as this can actually be worse than no compensation at all under most circumstances. For example, if 90% of the link is coiled up in the shade and only 10% of the link is actually used in a sunny area to measure elevation, the Gaucher TCD compensation circuit will falsely correct by 90% in favor of the shade rather than for the 10% of the link at the warmer temperature where the liquid column is actually contributing to the reading. Similarly, dramatic compensation errors can occur when a link lies at various slopes and through traverses through various temperatures.

To avoid these problems it is necessary to integrate a temperature-pressure or density-pressure product along the entire length of the link. In other words, compensation temperature or density should only be measured and averaged in proportion to its vertical column contribution to the total link pressure. Where there is no association with a vertical column or pressure head there should be no temperature or density contribution to the average.

Another problem of equal or greater significance addressed by this invention relates to dissolved gases in the link liquid which can be drawn out of solution or past tubing joints or fittings under negative hydrostatic pressures that can develop during normal operation of an hydrostatic altimeter. According to Henry's Law, all gas solubility in liquids is directly proportional to the pressure at a gas or bubble interface with the liquid and inversely proportional to the temperature of the liquid. Even if dissolved gases were removed from a liquid prior to installation in a sealed hydrostatic altimeter, nearly all flexible tubing is permeable to gases and it is always possible that the sensor or associated joints could leak air into the liquid under negative pressures. An excessive quantity of trapped gases can not be absorbed into a gas saturated liquid and can form bubbles at unpredictable locations along the link, thereby reducing the pressure measured at the transducer and causing erroneous readings. Gases coming out of solution cause bubbles in the liquid which can cause erroneous readings.

Another problem addressed by this invention is the frequent occurrences of differences in atmospheric pressure between the locations of the link ends. Such differences can, for example, occur in buildings due to an unbalance heating, ventilation or air conditioning system. Outdoors they can occur as a result of wind particularly around buildings or obstructions. Similarly, a difference can occur due to a difference in altitude between the link ends, but this has been found to be negligible over the practical vertical span of such altimeters.

This invention can provide liquid temperature compensation, prevent bubble formation, and eliminate problems caused by atmospheric pressure differences. Other advantages and attributes of this invention will be readily discernable upon a reading of the text hereinafter.

SUMMARY OF THE INVENTION

It is thus an object of this invention to provide an hydrostatic altimeter, having a liquid link, incorporating compensation for the effects of differential temperatures on the link liquid.

It is a further object of this invention to provide a positive pressure system for the link liquids of hydrostatic altimeters to avoid the bubble problem as previously explained.

It is a further object of this invention to provide a hydrostatic altimeter having a link that is immune to differences in atmospheric pressure between ends of the link.

These and other objects are accomplished by a device for providing a signal that is a function of relative altitude having: a contained body of liquid, an elongated flexible conduit in communication with the body of liquid at one end and filled with the liquid, the conduit having a vertical span, a hydrostatic transducer in communication with the conduit and connected thereto at an end remote from the body of liquid for transducing hydrostatic pressure to a corresponding signal, the signal being a function of the altitude of the transducer relative to the body of liquid, and means for applying pressure to the body of liquid of sufficient magnitude to keep the liquid at a positive pressure throughout the vertical span of the conduit. The means for applying pressure can be a bladder for containing the liquid, a surface for pressing against the bladder, and a pressurized gas driving the surface against the bladder. In other embodiments the body of liquid is also under ambient atmospheric pressure.

Additionally a spring force can drive the surface. The transducer can be a differential transducer having a measurement conduit, i.e. link, connected to one port of the transducer with a second conduit placing a second port in communication with the pressurized gas driving the surface. In another embodiment the device can: have a contained body of a selected first liquid under ambient atmospheric pressure, a first elongated flexible conduit in communication with the body of first liquid at one end and filled with the first liquid, a contained body of a selected second liquid disposed within but not mixed with the body of first liquid, the liquids being selected to cause the effective temperature coefficient of density of the device to be less than the temperature coefficient of density of the individual liquids, a second elongated flexible conduit in communication with the body of second liquid at one end and filled with the second liquid, and an hydrostatic transducer for differentially transducing hydrostatic pressure to a corresponding signal, the signal being a function of the altitude of the transducer relative to the body of first liquid, the first conduit being connected to a first port and the second conduit being connected to a second port. The device can also have means for applying additional pressure to the body of the first selected liquid of sufficient magnitude to keep both liquids at a positive pressure with respect to ambient atmospheric pressure throughout the vertical span. In another embodiment the device can produce two signals and have: a contained body of first liquid under ambient atmospheric pressure, a first elongated flexible conduit in communication with the body of first liquid at one end and filled with the first liquid, a contained body of second liquid disposed within but not mixed with the body of first liquid, the temperature coefficients of density of the liquids being suitably different, a second elongated flexible conduit in communication with the body of second liquid at one end and filled with the second liquid, a first transducer for differentially transducing hydrostatic pressure to a corresponding first signal, the signal being a function of the altitude of the first transducer means relative to the body of first liquid, the first conduit being connected to a first port and the second conduit being connected to a second port, and a second transducer for producing a corresponding second signal, the second signal being a function of the altitude of the second transducer means relative to the body of first liquid, the second conduit being connected to an input port of said second transducer.

DESCRIPTION OF THE PREFERRED EMBODIMENT

Figure 1:
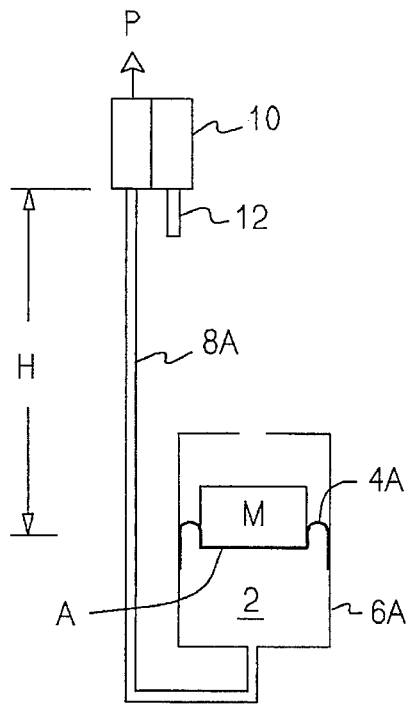
FIG. 1 is a diagrammatical representation of a first embodiment of this invention.

A review of the theory behind a basic hydrostatic altimeters would be helpful. One of the fundamentals of fluid statics is that at the end of a liquid filled tube a pressure, P, is developed which is equal to the product of the difference in height, H, between the ends of the tube, the density of the liquid within the tube, D, and the acceleration of gravity, g, or P=HDg. Since the acceleration of gravity is nearly constant over the earth, Dg= W where W is the specific weight of liquid. The specific weight for water for example is 62.3 lbs/ft$^3$ at room temperature. By substitution the expression is reduced to P=HW. Most hydrostatic altimeter designs assume that W is essentially constant which means that H is directly proportionate to P or is equal to P/W. Unfortunately W is not always constant, and as will be explained, temperature influences on the W of a link liquid can induce significant reading errors without proper compensation.

Almost all materials are known to expand and become less dense with temperature rise exhibiting what is commonly known as a negative temperature coefficient of density (TCD). Some liquids have a lower TCD than others but all have a TCD that must be dealt with in selecting an hydrostatic altimeter link liquid. The TCD for a properly selected nonfreezing liquid such as a 50/50 solution of ethylene glycol/water has a reasonably uniform TCD of −520 ppm/°C. over the range of −30° C. to +50° C. A designer can attempt to compensate for the TCD of the liquid by temperature compensation near the pressure transducer, however it is unlikely that the liquid temperature and density near the transducer will be equal to those same parameters at the portion of the hydrostatic link where the changes in elevation exist. In most cases the resulting error is reasonably small and certain measurement practices may be followed to further minimize link TCD error. Tests have shown that on a hot day it is possible for link temperatures in the shade to differ by 10° C. or 15° C. from link temperatures on hot asphalt in direct sunlight. If a system contains an ethylene glycol solution whose temperature compensation is in the shade but with hydrostatic pressure developed on hot pavement, the resulting elevation reading will be excessive by 0.5"/100 or 0.5%.

The ideal hydrostatic altimeter liquid would have a zero TCD, be readily available, be non freezing down to −40° C., be reasonably non-toxic as well as non reactive with the tube, sensor and reservoir. Unfortunately research to this point has failed to locate such an ideal liquid. Water has a reasonably small TCD of about −250 ppm/°C. at room temperature and gets even smaller on its way toward freezing. Unfortunately, the TCD of water varies significantly over temperature particularly at higher temperatures making temperature compensation more difficult. Obviously, the most serious problem is the fact that water freezes at 0° C. making it useless for low temperature measurements and subject to causing damage to the liquid containment. Mercury has a low TCD of about −180 ppm/°C. which is reasonably stable over temperature, however mercury is expensive, highly toxic and after all that still has a significant TCD. The hydrostatic liquid described within the Gaucher patent is silicon oil having a TCD of 1300 ppm/°C. which is somewhat typical of may petroleum based liquids as well as acids, and alcohols.

The Gaucher concept attempted to correct for changes in density of the link by measuring the average temperature of the entire link. Unfortunately the concept fails to properly compensate the link vertical column elements because it assumes that the column elements are at the same temperature and density as the average link temperature and density and therefore causes the very error which Gaucher set out to correct.

Somehow only the contributing vertical portions or columns of the link must receive compensation for density changes. One means to approximate this goal would be to circulate the link liquid past a link-end temperature sensor in an attempt to mix and average the liquid density while measuring its average temperature. This approach is undesirable because it requires pumps, energy and time while failing to properly compensate for all of the error simply because of physical limitations.

Referring now to the figures, illustrated in FIG. 1 is a first embodiment having a body of liquid 2 that fills a chamber defined by a bladder or rolling diaphragm 4A disposed in a container 6A. A mass M having an area A applies a force against the diaphragm due to gravity. Communicating with the liquid body is a single bore tube, the link 8. At an end of the link remote from the end of the body of liquid is a pressure transducer, i.e. sensor 10, which can be a gauge transducer or a differential transducer with one port 12 vented to air. This sensor measures the hydrostatic pressure or pressure head existing at the remote end of the link. As illustrated, the remote end of the link is at a height H above the body of liquid. Ideally the pressure P measured by the sensor is the sum of the pressure head developed by the height of the liquid and the pressure added by the weight of the mass as follows:

$$P = H \times W + \frac{F}{A}$$

where $W$ is the specific weight of the liquid
and $F$ is the force applied by the mass.

The amount of pressure added to the liquid by the weight of the mass is preferably sufficient to keep bubbles from developing under the hydrostatic pressure (vacuum) developed for the maximum rise of the sensor above the body of liquid. In other words, the magnitude of the F/A term should be large enough to prevent P from going negative under normal operational limits. For example, if a sensor whose link contains water is to be raised 20' above the bladder the minimum pressure required from the weight for zero pressure at the transducer would be F/A=20 ft.×62.4 lb/ft$^3$=1,248 psf or 8.7 psi. If the surface area of the mass is one square inch then its required weight would be 8.7 lb. If the force from the mass is kept perfectly normal to the surface of the bladder then its known pressure can be subtracted from the total pressure measured at the sensor to display the differential elevation. In this way the entire liquid system is under positive pressure for all modes of altimeter operation.

Figure 2:
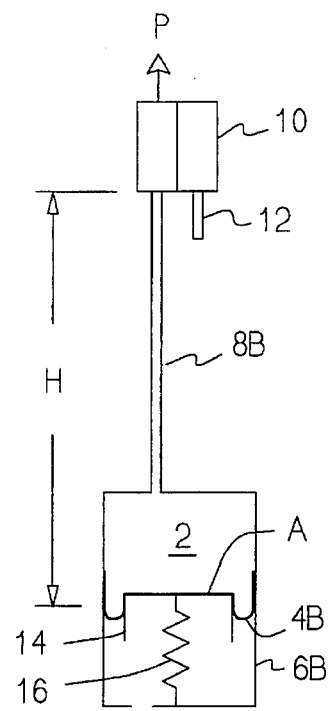
FIG. 2 is a diagrammatical representation of a second embodiment of this invention.

Referring to FIG. 2, a second embodiment of this invention is similar to the first embodiment in that it has a body of liquid 2 that fills a bladder or rolling diaphragm 4B disposed in a container 6B, and communicating with the liquid body is a single bore tube, link 8B, at a remote end of which is a pressure sensor 10. However in place of the mass M is a piston 14 having a head area A driven by a spring 16 to apply a force F against the diaphragm. The spring eliminates problems of orientation associated with the mass but unless the spring is a perfectly constant force spring, its pressure bias can vary slightly with volummetric variation due to liquid or tube expansion or contraction. The principals of operation underlying the two embodiments are fundamentally the same, and the amount of pressure added by the spring driven piston is sufficient to prevent bubbles from developing for all modes of operation. However, since both of these embodiments are "open loop" each is inherently capable of generating a different bias than expected at the sensor creating reading errors. The following embodiments are closed loop which require a dual bore link which serves to eliminate such bias errors.

Figure 3:
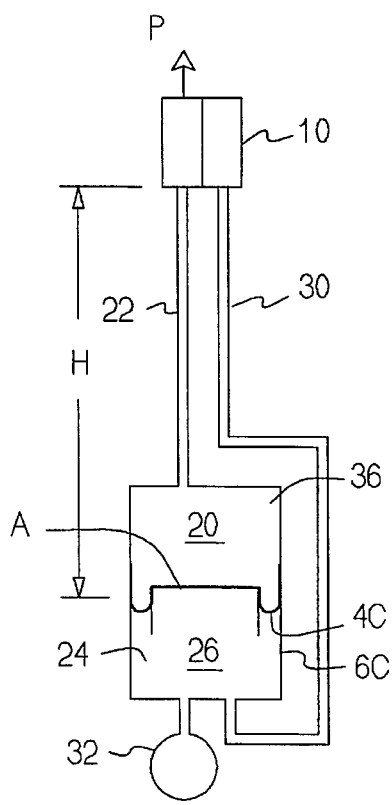
FIG. 3 is a diagrammatical representation of a third embodiment of this invention.

Referring to FIG. 3, a third embodiment is illustrated to have a container 6C divided into two closed chambers by a bladder or rolling diaphragm 4C. An upper chamber 18 is filled with a liquid 20 having a specific weight of W and a temperature coefficient of density of TCD. The upper chamber communicates with a first conduit link 22. The lower chamber 24 in the container is filled with a pressurized gas 26 which drives a piston 28 having a head area A to apply a force F against the diaphragm. Communicating with the pressurized gas chamber is a second conduit link 30. Preferably both conduits are embodied in a dual bore flexible tube. Both conduits are connected at their respective remote ends to separate input ports of a differential pressure sensor 10. The sensor measures the pressure difference between the liquid filled conduit and the gas filled conduit. A source 32 of replacement gas is also provided to compensate for gas loss due to joint leakage of diffusion through the gas permeable flexible tube. Gas replacement can consist of a simple mechanical finger pump for air, a compressed gas cartridge, chemical or even microbial reactants. Alternatively, a high molecular weight gas having low tubing solubility such as a perflourocarbon gas could provide an effectively permanent bias pressure. As illustrated, the remote ends of the conduits are at a height H above the top level of the liquid. Typically the pressure developed by the gas column is negligible making the pressure, P measured by the sensor simply the pressure head of the liquid, but taking into consideration the effects of temperature, the pressure measured by the sensor is as follows:

$$P = H \times W(1 + dT \times TCD)$$

where $dT = T0 - T1$ (temperature differential) and $TCD = $ppm/degree

The gas is sufficiently pressurized to exceed any hydrostatic vacuum developed within operational limits thereby preventing bubble formation in the liquid.

Referring again to FIG. 3, it can be seen that the pressure transducer is differential and that its second port (the one not connected to the liquid conduit) is not open to ambient air. Rather the pressure applied to the second port is approximately the same as the pressure in the lower chamber, and is the same as the pressure applied to the liquid in the upper chamber. In this way the transducer is biased commonly with the body of liquid. This common mode biasing eliminates any reading offset due to the bias pressure and prevents fluctuations due to atmospheric pressure differences.

Figure 4:
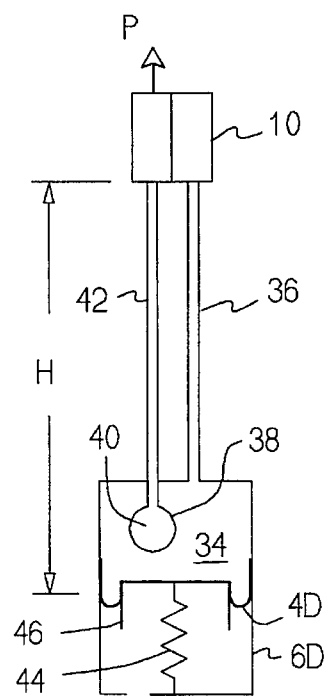
FIG. 4 is a diagrammatical representation of a fourth embodiment of this invention.

Referring to FIG. 4, a fourth embodiment of this invention is illustrated to have a bladder or rolling diaphragm 4D disposed in a container 6D and filled with a body of a first liquid 34 having a specific weight of W1 and a temperature coefficient of density of TCD1. Communicating with the bladder is a first conduit 36 filled with the first liquid. Within the bladder is a second bladder 38 filled with a second liquid 40 having a specific weight of W2 and a temperature coefficient of density of TCD2. Communicating with this second bladder is a second conduit 42 filled with the second liquid. Preferably both conduits are embodied in a dual bore tube. A spring 44 drives a piston 46 having a head area A against the first bladder with a force F. The remote ends of the conduits are connected to separate input ports of a differential pressure transducer 10. The transducer measures the difference in pressure between the two liquids in their respective conduits. As illustrated, the remote ends of the conduits are commonly at a height H above the top surface of the first liquid. Ideally the pressure P measured by the sensor is the difference of the pressure heads in the two conduits as follows:

$$P=H\times(D1-D2)$$

Taking into consideration the effects of temperature, the pressure measured by the sensor is as follows:

$$P=H\times(D1-D2)+H\times dT(TCD1\times D1-TCD2\times D2)$$

where $$dT=T0-T1 \text{ (temperature differential) and } TCD=ppm/degree$$

Ideally the two liquids have the following relationship:

$$\frac{D1}{D2}=\frac{TCD2}{TCD1}$$

in which case the effects of temperature completely cancels out. However to date two liquids suitable for this application having such an ideal relationship has not been found, but some combinations come close. For example, a first liquid of 70% ethylene glycol and 30% water with a density of 1.10 g/cc and a TCD of 620 ppm/C, and a second liquid of 100% kerosene with a density of 0.80 g/cc and a TCD of 870 ppm/C will combine to reduce the effective TCD to about 20 ppm/C which is very small fraction of either liquid operating alone.

Referring again to FIG. 3, the link 30 can be used for temperature compensation also. If a high molecular weight gas is used such as a Dupont Freon it would have a density of about 5 times the density of air at atmospheric pressure or about 0.5% of the density of 70/30 ethylene glycol-water. Since all gases have a TCD which is about 3,000 ppm/C or about 5 times that of the liquid, it is conceivable that its pressure could be raised to 20% of the liquid density by compressing to 40 atmospheres or about 600 psi. If its pressure could remain constant with temperature by allowing expansion into a variable volume chamber having a spring biased diaphragm, then the gas bias would also effectively offset the liquid TCD.

Figure 5:
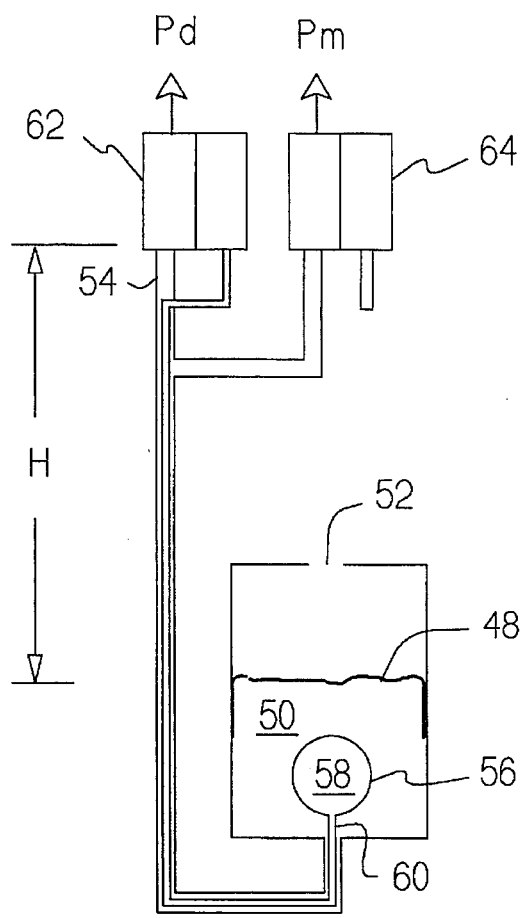
FIG. 5 is a diagrammatical representation of a fifth embodiment of this invention.

Referring to FIG. 5, a fifth embodiment of this invention is illustrated to have a first bladder 48 filled with a first liquid 50 and under ambient air pressure through vent 52. The first bladder is in communication with a first conduit 54. Disposed within the first bladder is a second bladder 56 filled with a second liquid 58 also under ambient air pressure felt through the surrounding first liquid. The second bladder is in communication with a second conduit 60 having an outer diameter smaller than the inner diameter of the first conduit and disposed concentrically therein. The conduits need not be concentric; they can also be parallel for easier attachment to fittings. At common remote ends, the two conduits are connected to separate input ports of a differential pressure transducer 62 which measures the difference in pressure between the two liquids in their respective conduits. The first conduit also communicates with a second pressure transducer 64 which measures only the pressure of the first liquid. Although illustrated as a differential transducer, the second transducer can be a gage pressure transducer.

Referring again to FIG. 5, this embodiment uses the differential pressure transducer in conjunction with the measurement transducer to integrate the liquid density along with pressure over the entire length of the link. The differential transducer has only one purpose - to measure the difference in pressure between the existing hydrostatic measurement link liquid and a second liquid link which parallels but is preferably concentric with the measurement link. The liquid in the second concentric link might be a liquid like alcohol which would have a TCD which deliberately differs significantly from that of the measurement liquid such as an ethylene glycol solution. The TCD's of the two liquids are suitably different if the changes in their respective specific weights per a selected unit of temperature are large enough for the transducer to detect a corresponding change in respective pressures. In other words, the TCD's must be different enough to compensate for errors within the measurement resolution of the device. The finer the resolution of the differential transducer, the closer the TCD's of the liquids can be. The two liquids would not need to be of equal densities at any particular temperature, but if they were close in density the maximum required span of the transducer could be reduced somewhat providing a higher resolution output.

Referring again to FIG. 5, the differential pressure transducer 62 constantly monitors the difference in pressure, $P_d$, caused by the product of the height H and the liquid density difference between the measurement liquid 50 and the compensation liquid 58 as follows:

$$P_d=H(W_m-W_c)=HW_d$$

At the same time, the measurement pressure transducer 64 generates a pressure, $P_m$, which results from the product of the same height and only the measurement link liquid, as follows:

$$P_m=HW_m$$

Because $P_m$ can be used to determine H then $P_d/H=W_d$ where $W_d$ is the difference in specific weights of the liquids within the two links. When the measurement link is used alone it is impossible to know if the changes in pressure or ultimately height display are due to changes in height or changes in the liquid density of the measurement link. However, changes in $W_d$ can be used to correctly compensate the measurement link because $W_d$ is height independent and therefore will only vary with temperature. It is also important to note that the differential pressure from which $W_d$ is derived, is produced only in proportion to the pressures developed by the vertical column elements of the link which generate the measurement pressure. This scheme properly solves the problem of link TCD which the Gaucher scheme fails to solve.

Referring again to FIG. 5, it should be understood that positive pressure bias can be applied to the first bladder 48 in the same manner as described above to avoid the bubble problem, and the pneumatic biasing scheme of embodiment three can be applied to make the apparatus immune to atmospheric pressure differences as well.

Figure 6:
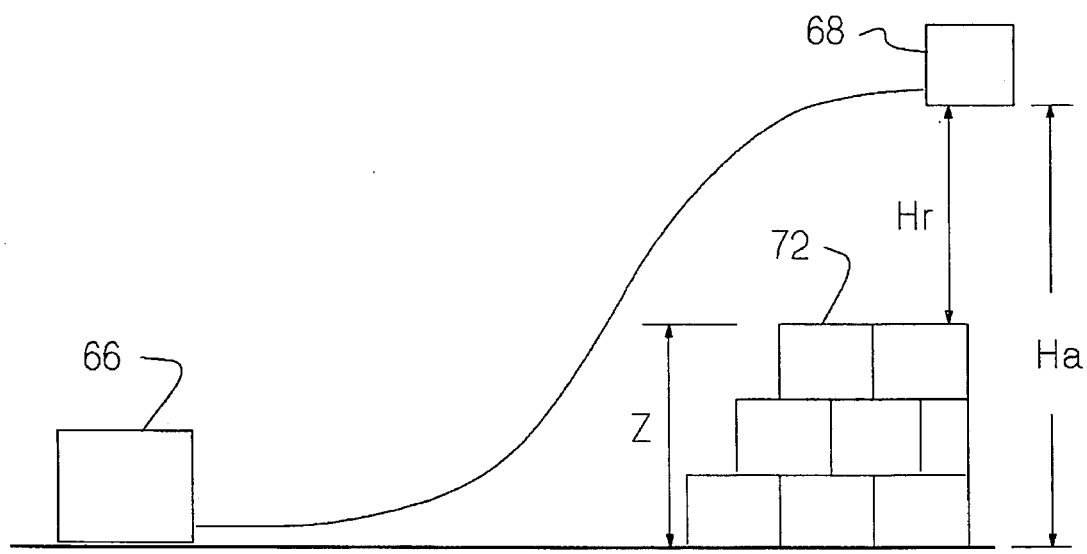
FIG. 6 is a diagrammatical representation of a method of using the fifth embodiment of this invention.

Referring to FIG. 6, illustrated is a use of the pressure measurements, $P_d$ and $P_m$, developed by the fifth embodiment (FIG. 5) to compensate for temperature. A base unit 66 containing the two bladders may be placed anywhere on the ground and a measurement module 68, which contains the two pressure transducers is placed at a site benchmark level 72. Included in the measurement module are preferably processing electronics, memory, a display and operator controls, such as described in U.S. Pat. No. 4,878,297 by Vories. Once the measurement module is placed at the benchmark level, a zero button is pressed to establish a zero display at that elevation. The processing electronics do not need to actually compute specific weight to derive its reading, instead it can ratiometrically compute calibration elevation from a known calibration pressure which is user set or checked by the user in the field. Typically the vertical span of the altimeter will have recently been calibrated or at least checked either at this site or at another. The altimeter is first calibrated by placing its measurement module at the same elevation as the base unit and pressing the zero button thereby storing in digital memory the measurement pressure transducer output (if any) at absolute zero elevation. The measurement module is then raised to a factory specified elevation such as 48 inches and the calibration button is pressed causing the difference between this and the pressure transducer output at zero height to be stored as an absolute calibration pressure, $P_o$ and multiplied by 48 forming a ratiometric relationship between calibration and measurement pressures to yield a value of absolute height as is summarized in the expression: $H_a = 48 P_m/P_o$. This ratiometric process tends to null a host of possible fixed system errors including negligible differences in the earth's gravitational constant. Without temperature compensation, the absolute height and a measurement module temperature are processed in a polynomial equation to generate a span/offset error compensation factor, E, which accounts primarily for link density and inherent transducer errors. Finally, the display value of relative height, $H_r$, is determined by adding or subtracting the compensated benchmark absolute height, Z, from the absolute compensated height measurement. The resulting expression is $H_r = [H_a \times E] - Z$.

With temperature compensation the output of the compensation pressure transducer is stored during span calibration as $P_{do}$ which is the absolute pressure difference between the calibration and measurement liquids resulting from the calibration height. When $P_{do}$ is divided by 48 the result is the calibration differential specific weight, $W_{do}$ which can be stored in digital memory when the span calibration button is pressed. Future values of $P_d$ are divided by $[H_a \times E]$ to yield the differential specific weight $W_d$ which is processed with each measurement to calculate a specific weight correction factor. The correction factor, C, is defined as one plus or minus the product of the change in differential density and a correction factor K or in symbolic terms: $C = 1 + [[W_d - W_{do}]/W_{do}]K$. K is a constant that relates the differential TCD of the calibration, $TCD_c$, and measurement liquids, $TCD_m$, so that the TCD of the measurement liquid will be corrected by the appropriate amount. The sign of terms that create C are set so that C increases with temperature at exactly the opposite rate that $W_m$ decreases in temperature. The result is that the height measured will be accurate regardless of the changes in density of the measurement liquid. The height then becomes: $H_r = [H_a \times E]C - Z$.

Figure 7:
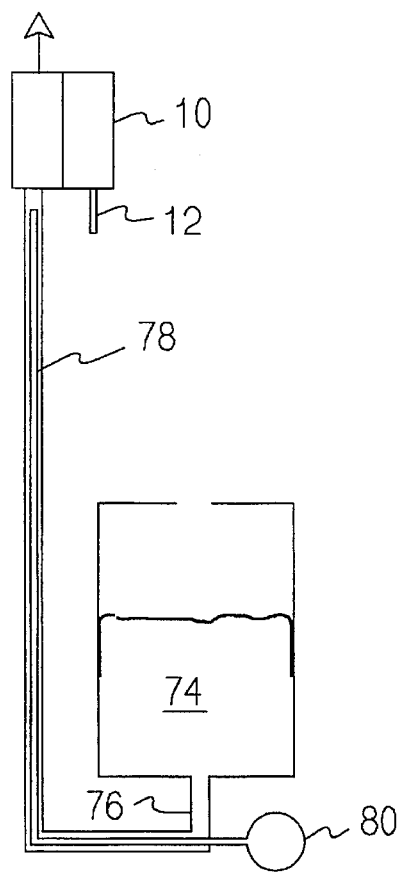
FIG. 7 is a diagrammatical representation of a sixth embodiment of this invention.

Referring to FIG. 7, a sixth embodiment is illustrated to have a transducer 10 linked to a body of liquid 74 by conduit link 76. Disposed within the link conduit and running substantially the entire length of it, is a highly permeable micro tube 78, such as a silicone rubber tube. This tube has an outer diameter much smaller than the inner diameter of the link conduit. Communicating with the micro tube is a vacuum pump 80 which maintains a vacuum in the micro tube. The micro tube is highly permeable to gases and the constantly maintained vacuum therein draws dissolved gases from the link liquid. Keeping the link liquid starved of dissolved gases eliminates or greatly reduces the bubble formation problem.

The first embodiment having the mass bias and the second embodiment having the spring bias are configured to inexpensively prevent bubble formation by using a low cost standard single bore tube to form the link. However, both are open loop and small uncontrollable variations in bias or atmospheric pressure can create additional reading errors and neither embodiment corrects for TCD of the liquid. Embodiment three uses a closed pneumatic loop back to the sensor to eliminate the error elements inherent in the open loop embodiments but does not correct for link TCD unless the pneumatic pressure of a heavy gas is raised to as high as 6000 psi (only 10 to 20 psi is needed for bubble prevention). The fourth embodiment requires that the ratio of densities of a pair of liquids be inversely equivalent (or as close as possible) to the ratio of TCD's for the two liquids to minimize the measurement TCD. With common bladder bias, typically a spring bias, bubble formation is prevented and the closed loop configuration prevents atmospheric pressure errors. Embodiment five is similar to four except that the requirements for the liquids are not so specific and the additional sensor adds cost to the device. Embodiment six prevents bubble formation by starving the liquid of dissolved gases by use of a highly permeable micro tube such as silicone rubber under constant vacuum within the link liquid conduit. It is reasonably simple to construct but requires pumping a vacuum at least a day prior to use of the device and does not correct for the link TCD.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

I claim:

1. A device for providing a signal that is a function of relative altitude comprising:

(a) a contained body of liquid, (b) an elongated flexible conduit in communication with the body of liquid at one end and filled with the liquid, the conduit having a vertical span, (c) means, in communication with the conduit and connected thereto at an end remote from the body of liquid, for transducing hydrostatic pressure to a corresponding signal, the signal being a function of the altitude of the transducer relative to the body of liquid, and (d) means for applying pressure to the body of liquid of sufficient magnitude to keep the liquid at a positive pressure throughout the vertical span of the conduit.

2. The device according to claim 1 wherein the means for applying pressure comprises:

(a) bladder means for containing the liquid, (b) surface means for pressing against the bladder means, and (c) pressurized gas driving the surface means against the bladder means.

3. The device according to claim 1 wherein the body of liquid is additionally under ambient atmospheric pressure and the means for applying pressure comprises bladder means for containing the body of liquid and a mass acting against the bladder over an area by force of gravity.

4. The device according to claim 1 wherein the body of liquid is additionally under ambient atmospheric pressure and the means for applying pressure comprises:

(a) bladder means for containing the body of liquid, (b) surface means for pressing against the bladder means, and (c) means for driving the surface means against the bladder means.

5. The device according to claim 4 wherein the means for driving the surface means is a spring force.

6. The device according to claim 2 wherein the means for transducing hydrostatic pressure is a differential transducer having at least two input ports, the conduit being connected to one port of said at least two input ports, and further comprising a second conduit placing a second of said at least two input ports in communication with the pressurized gas driving the surface means.

7. A device for providing a signal that is a function of relative altitude comprising:
   (a) a contained body of a selected first liquid under ambient atmospheric pressure,
   (b) a first elongated flexible conduit in communication with the body of first liquid at one end and filled with the first liquid,
   (c) a contained body of a selected second liquid disposed within but not mixed with the body of first liquid, the liquids being selected to cause the effective temperature coefficient of density of the device to be less than the temperature coefficient of density of the individual liquids,
   (d) a second elongated flexible conduit in communication with the body of second liquid at one end and filled with the second liquid, and
   (e) means, having at least two input ports, for differentially transducing hydrostatic pressure to a corresponding signal, the signal means being a function of the altitude of the transducer means relative to the body of first liquid, the first conduit being connected to a first of said at least two ports and the second conduit being connected to a second of said at least two ports.

8. The device according to claim 7 wherein the first and second conduits have a common vertical span, and further comprising means for applying additional pressure to the body of first liquid of sufficient magnitude to keep both liquids at a positive pressure with respect to ambient atmospheric pressure throughout the vertical span.

9. A device for providing two signals that are each a function of relative altitude comprising:
   (a) a contained body of first liquid under ambient atmospheric pressure,
   (b) a first elongated flexible conduit in communication with the body of first liquid at one end and filled with the first liquid,
   (c) a contained body of second liquid disposed within but not mixed with the body of first liquid, the temperature coefficients of density of the liquids being suitably different,
   (d) a second elongated flexible conduit in communication with the body of second liquid at one end and filled with the second liquid,
   (e) first means, having at least two input ports, for differentially transducing hydrostatic pressure to a corresponding first signal, the signal being a function of the altitude of the first transducer means relative to the body of first liquid, the first conduit being connected to a first of said at least two ports and the second conduit being connected to a second of said at least two ports, and
   (f) second means for transducing hydrostatic pressure to a corresponding second signal, the second signal being a function of the altitude of the second transducer means relative to the body of first liquid, the second conduit being connected to an input port of said second transducer means.

10. The device according to claim 9 wherein the second conduit is disposed within and concentric with the first conduit, there being an annular gap between the second conduit and the first conduit, the conduits being separated only proximate the first transducer means for separate connection to said first transducer means.

* * * * *